United States Patent [19]

Després

[11] Patent Number: 4,613,025
[45] Date of Patent: Sep. 23, 1986

[54] FRICTION CLUTCH MECHANISM WITH IMPROVED TRAVEL LIMITING DEVICE

[75] Inventor: Dominique Després, Clichy, France

[73] Assignee: Valeo, Paris, France

[21] Appl. No.: 463,832

[22] Filed: Feb. 4, 1983

[30] Foreign Application Priority Data

Feb. 4, 1982 [FR] France ............................. 82 01809

[51] Int. Cl.[4] ..................... F16D 13/44; F16D 13/58; F16D 13/71
[52] U.S. Cl. ............................... 192/70.18; 192/89 B; 192/109 R
[58] Field of Search ............... 192/70.18, 70.28, 89 B, 192/109 R

[56] References Cited

U.S. PATENT DOCUMENTS

| | | | |
|---|---|---|---|
| 1,943,261 | 1/1934 | Knutson | 248/71 |
| 2,100,017 | 11/1937 | Van Uu | 248/71 X |
| 2,511,801 | 6/1950 | Churchill | 248/71 |
| 2,541,611 | 2/1951 | Reed | . |
| 3,283,864 | 11/1966 | Motsch | 192/89 B X |
| 3,489,256 | 1/1970 | Binder et al. | 192/70.18 X |
| 3,640,361 | 2/1972 | Spichala | 192/70.18 |
| 4,122,929 | 10/1978 | Maucher et al. | 192/70.18 |
| 4,200,176 | 4/1980 | Courbot | 192/89 B |
| 4,423,804 | 1/1984 | Kettell et al. | 192/70.18 X |
| 4,437,555 | 3/1984 | Tomm et al. | 192/70.18 X |

FOREIGN PATENT DOCUMENTS

| | | |
|---|---|---|
| 0891803 | 10/1953 | Fed. Rep. of Germany ... 192/70.18 |
| 2355825 | 5/1975 | Fed. Rep. of Germany .... 192/89 B |
| 2906863 | 9/1980 | Fed. Rep. of Germany . |
| 2927424 | 1/1981 | Fed. Rep. of Germany .... 192/89 B |
| 2437525 | 4/1980 | France . |
| 1394118 | 5/1975 | United Kingdom .............. 192/89 B |
| 1435908 | 5/1976 | United Kingdom .............. 192/89 B |
| 1443367 | 7/1976 | United Kingdom .............. 192/89 B |
| 2022730 | 12/1979 | United Kingdom .............. 192/89 B |
| 2055997 | 3/1981 | United Kingdom .............. 192/70.18 |
| 2056591 | 3/1981 | United Kingdom .............. 192/89 B |

*Primary Examiner*—Rodney H. Bonck
*Attorney, Agent, or Firm*—Charles E. Brown; Charles A. Brown

[57] ABSTRACT

A clutch mechanism is provided with an improved travel limiting device. This device comprises a plurality of retaining members (38) on the perimeter of the pressure plate (14). Each of these members (38) hooks onto a retractable member (34) forming part of the cover (10) and limiting the axial travel of the plate (14) relative to the cover (10). The mounting of the combination of the plate (14), diaphragm spring (11) and cover (10) is particularly simple in that it is effected without any relative rotational movement.

The retaining members are each adapted for hooking engagement with a limiting member following elastic movement beyond the limiting member.

19 Claims, 23 Drawing Figures

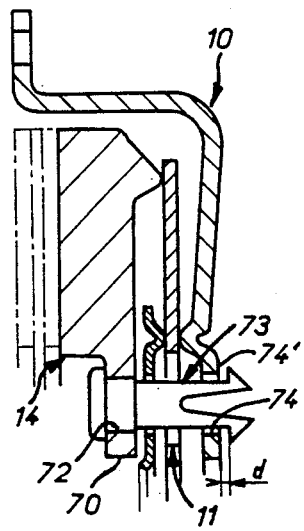
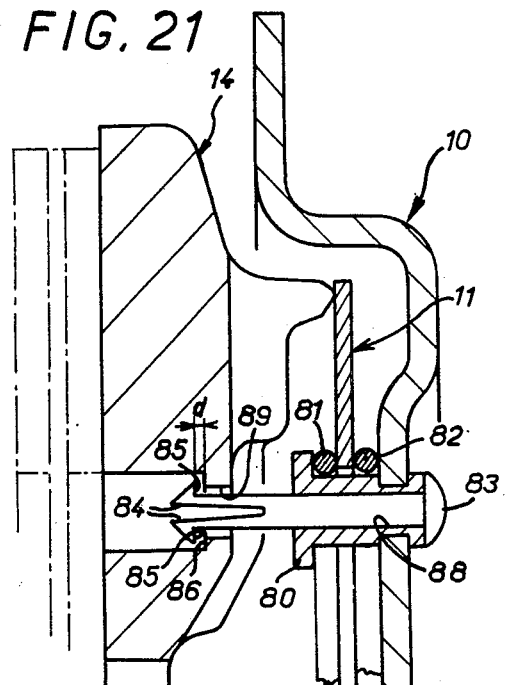
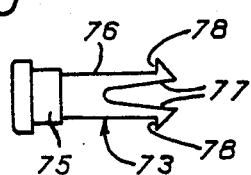
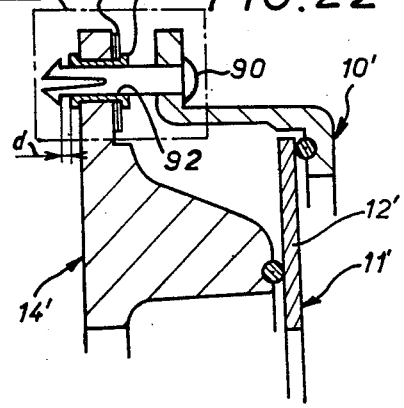
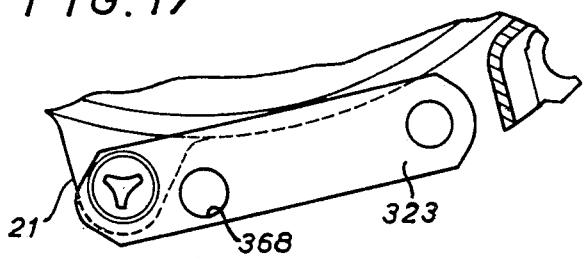
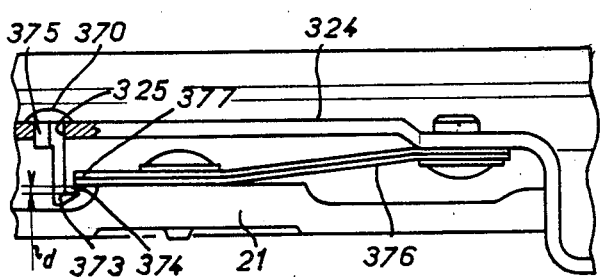
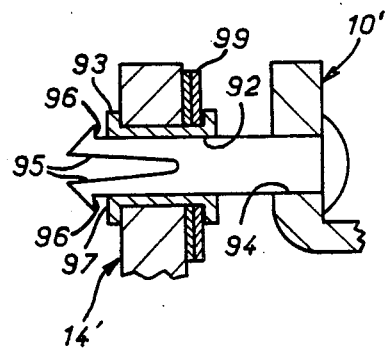

FRICTION CLUTCH MECHANISM WITH IMPROVED TRAVEL LIMITING DEVICE

BACKGROUND OF THE INVENTION

1. Field of the Invention

The present invention relates to a clutch mechanism, particularly but not exclusively for automotive vehicles, of the kind comprising a pressure plate, elastic means such as a diaphragm spring and a cover.

2. Description of the Prior Art

The invention is more particularly concerned with means for limiting the travel of the pressure plate relative to the cover to prevent the drive tangs, constituting the rotational linkage between and permitting axial movement between the pressure plate and the cover the pressure plate and the cover, from tending to deteriorate when the pressure plate/diaphragm spring/cover combination is pre-assembled, but not yet bolted to the reaction plate. This situation occurs routinely, when pre-assembled units are kept in storage, for example.

The function of the tangs in question is not only to link the pressure plate elastically to the cover, but also to contribute to urging the pressure plate to the released position on releasing the clutch, to prevent the pressure plate rubbing on the friction disk. For this purpose, these tangs are treated to provide sufficient elastic return force.

When the pre-assembled combination is not bolted to the reaction plate, the pressure plate is urged strongly outwards by the diaphragm spring. As the only force to resist this is that provided by the tangs, these are also urged outwardly until equilibrium is established between the return force of the tangs and the force of the diaphragm spring. The tangs are therefore deformed and this distension may result in deterioration of their properties.

Deterioration may also occur, even if expansion of the diaphragm spring is limited, during careless handling, as when dropped, for example. By virtue of its non-negligible weight and its inertia, the pressure plate may move away from the cover to an extent sufficient to bring about significant deterioration of the properties of the tangs.

For this reason it is important to provide means for limiting the travel of the pressure plate.

Known limiting means include radial projections on the pressure plate and circumferential abutments on the cover. This involves relative rotation to bring the appropriate parts into axial alignment, after inserting the pressure plate into the cover.

Such arrangements are not convenient to use.

During assembly, it is not only necessary to insert the pressure plate into the cover (axial movement), but also to rotate the pressure plate so as to engage the projections opposite the abutments. Special-purpose assembly machines must therefore be provided to this end, able to sequence the necessary axial and then rotational movements.

This type of assembly results in relatively high production costs, arising out of the need for assembly benches as previously referred to and the associated assembly time.

SUMMARY OF THE INVENTION

The present invention consists in a clutch mechanism of the kind comprising a combination of components adapted to be pre-assembled prior to utilization, said combination incorporating a part which is fixed in the axial direction, a part which is movable in the axial direction, elastic means acting on said movable part, means adapted to limit axial movement of said movable part, a retaining member supported by a first of said fixed and movable parts, and a retractable limiting member supported by the second of said fixed and movable parts, said retaining member being adapted for hooking engagement with said limiting member following elastic movement beyond said limiting member.

The fitting of the travel limiting means is considerably simplified in that relative axial movement is all that is required. These means are also of simple design and require only slight modification of the cover and the pressure plate.

This arrangement provides for considerable simplification of the assembly of clutch mechanisms, while avoiding the need for undue modification of the covers or pressure plates of existing clutch mechanisms.

To assemble a clutch mechanism in accordance with the present invention, it is only necessary to engage the pressure plate in the cover and to apply sufficient force to the plate to enable the retaining members to move elastically beyond the retractable limiting members by pushing these apart. This assembly method is hereinafter referred to as "clipping".

In one embodiment of the invention, the retaining member is in the form of a boss forming a hook member fast with the pressure plate, each hook member comprising a retaining abutment surface in face to face relationship with a limiting abutment surface on the limiting member, after axial engagement of the pressure plate in the cover and elastic movement of the hook members beyond the limiting members, while the retractable limiting member is in the form of a tang produced by forming a U-shaped hole in a peripheral rim of the cover.

This advantageous arrangement requires only partial modification of conventional type clutch covers, providing a flexible tang which is particularly well suited to fulfilling the function of a retractable limiting member.

During assembly, each boss forming a hook member can, provided that adequate force is applied to the pressure plate, push out the corresponding tang, the end surface of which constitutes an abutment surface for the hook members.

In another embodiment, the limiting member consists of a peg comprising lugs which can deform towards one another elastically and which are provided with a shoulder, while the retaining member consists of an abutment bearing surface surrounding a bore in which the peg slides.

This particularly advantageous arrangement requires only very minor modification of existing type clutch mechanisms. The bore may, for example, be formed in a lug attached to the pressure plate identical to those used for attaching the drive tangs, this lug being disposed in face to face relationship with an existing area on the cover formed with a bore. The peg is adapted to be crimped into the bore in the cover and to slide in that in the lug.

This embodiment is particularly economic.

Other objects and advantages will appear from the following description of examples of the invention, when considered in connection with the accompanying drawings, and the novel features will be particularly pointed out in the appended claims.

BRIEF DESCRIPTION OF THE DRAWINGS

FIG. 4 shows the detail marked IV in FIG. 2 to a larger scale.

FIG. 5 is a partial plan view of the clutch mechanism in the direction of the arrow V in FIG. 4.

FIGS. 6 and 7 are views corresponding to FIGS. 4 and 5, respectively, showing an alternative embodiment of the means for limiting the travel of the pressure plate.

FIGS. 8 and 9 are also views corresponding to FIGS. 4 and 5, respectively, showing a further embodiment of the means for limiting the travel of the pressure plate.

FIG. 17 is a view corresponding to FIG. 15 of a variant of this embodiment.

FIG. 18 is a view corresponding to FIG. 16 of another variant of this embodiment.

FIG. 19 is a partial cross-section through a clutch mechanism, showing another embodiment of the present invention.

FIG. 20 is a view in elevation of the peg in FIG. 19.

FIG. 21 is a schematic partial cross-section through a clutch mechanism, showing another embodiment of the present invention.

FIG. 22 is a schematic partial cross-section through a clutch mechanism, showing a further embodiment of the present invention.

FIG. 23 shows the detail marked XXIII in FIG. 22 to a larger scale.

DESCRIPTION OF THE PREFERRED EMBODIMENTS

Figure 1:
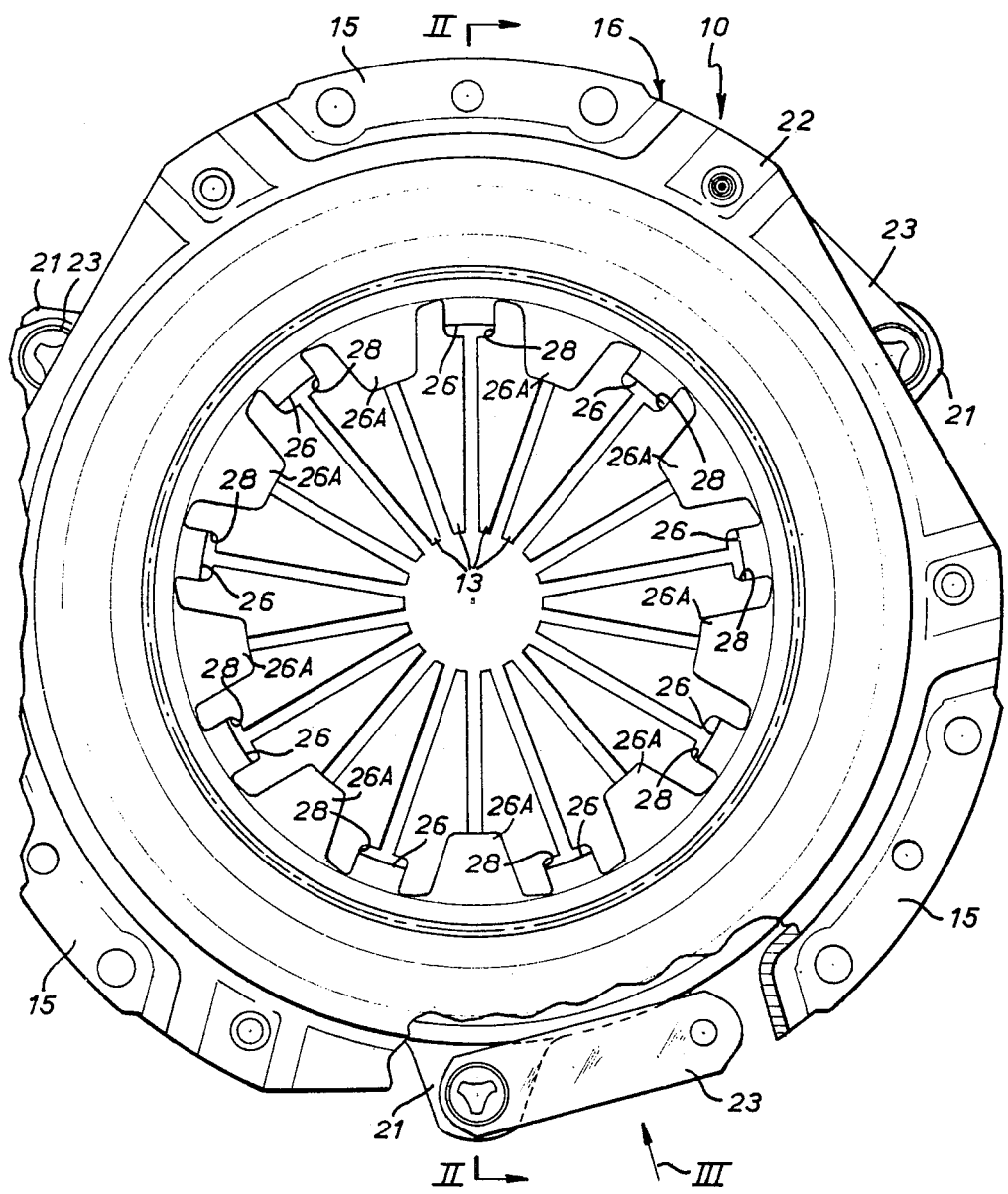
FIG. 1 is a view in elevation in the direction of the arrow I in FIG. 2 of a clutch mechanism in accordance with the present invention.

Referring to FIGS. 1 to 5, the diaphragm spring type clutch mechanism in accordance with the invention generally comprises a first generally annular member or cover 10, a second generally annular member or diaphragm spring 11 having a peripheral part 12 forming a Belleville spring and a central part subdivided into radial fingers 13, assembly means pivotally attaching diaphragm spring 11 to cover 10 and described in detail hereinafter, and a third annular member or pressure plate 14 which is constrained to rotate with cover 10 while being axially movable relative thereto, as will be described in more detail hereinafter, on which the peripheral part 12 of diaphragm spring 11 forming the Belleville spring bears.

Figure 2:
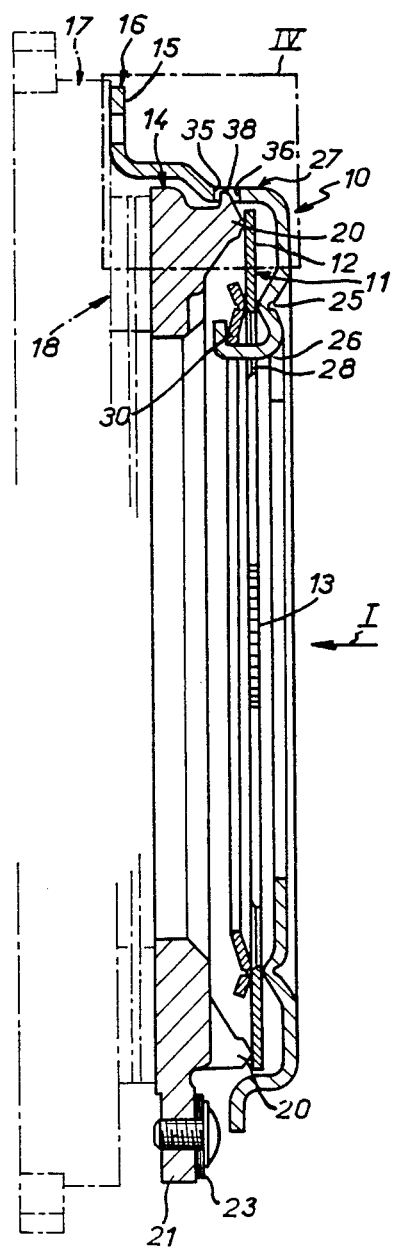
FIG. 2 is a diametral cross-section through the clutch mechanism on the line II—II in FIG. 1.

Areas 15 on a peripheral radial flange 16 of cover 10 are adapted to bear on a reaction plate or flywheel 17, represented schematically for purely illustrative purposes in chain-dotted line in FIG. 2 and attached to a first shaft, in practice a driving shaft. Inserted between reaction plate 17 and pressure plate 14 is a friction disk 18, also represented schematically in chain-dotted line in FIG. 2, which is constrained to rotate with a second shaft, in practice a driven shaft.

Pressure plate 14 has a number of axial bosses 20 on which bears the peripheral part 12 of diaphragm spring 11 forming the Belleville spring.

Figure 3:
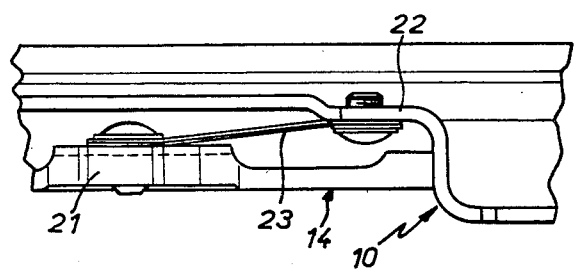
FIG. 3 is a partial view of the clutch mechanism in the direction of the arrow III in FIG. 1.

On the periphery of pressure plate 14 are spaced radially projecting lugs 21 between which and areas 22 of peripheral flange 16 of cover 10 drive tangs extend in a direction substantially tangential to a circumference of the assembly, the drive tangs 23 constraining the pressure plate to rotate with cover 10 while permitting relative axial displacement (see FIG. 3). These tangs are screwed to the cover and to the plate. As an alternative (not shown), they may be rivetted.

These arrangements are well-known in themselves, and since they do not constitute part of the present invention they will not be described in further detail here.

Cover 10 offers primary support to diaphragm spring 11, more particularly to the inner perimeter of peripheral part 12 thereof forming the Belleville spring. In the embodiment shown, it is formed for this purpose with a deformation constituting a first support ring 25 (FIG. 2). The assembly means pivotally attaching diaphragm spring 11 to cover 10 comprise a fourth annular part or ring 30 disposed on the opposite side of diaphragm spring 11 from cover 10. Also, thin flat retaining lugs 26, of which there are nine in the embodiment shown, have axial parts which pass through apertures 28 formed in diaphragm spring 11 near the roots of radial fingers 13 and which couple ring 30 to cover 10.

In the embodiment shown, retaining lugs 26 are formed integrally with cover 10, by appropriate bending and cutting.

The combination of the four generally annular components is generally pre-assembled and stored prior to mounting on the reaction plate.

One embodiment of the means for limiting the travel of the pressure plate will now be described with reference to FIGS. 4 and 5, on the hypothesis that the mechanism is in the mounted position. A peripheral rim 27 of cover 10 contiguous with radial flange 16 has, in line with bosses 20 on the pressure plate, U-shaped holes 33 oriented in the axial direction, with the top of the U shape disposed towards the reaction plate. The forming of hole 33 produces a retractable abutment or limiting member in the form of a flexible tang 34, leaving between the end surface 35 of tang 34, referred to hereinafter as the abutment or limiting surface, and the transversal edge 36 delimiting the base of the U shape of hole 33 a gap 37 of pre-determined width.

Each of bosses 20 on pressure plate 14 on which bears diaphragm spring 11 carries a retaining member in the form of a boss 38 constituting a hook member located on the external edge of the pressure plate. Hook member 38 has a flat retaining surface 39. The respective dimensions of cover 10 and plate 14, the arrangement of axial bosses 20, and the relative positions of the plate and cover are such that, after axial engagement of the pressure plate in the cover, surface 39 of each hook member is in face to face relationship with surface 35 of a corresponding tang.

The operation of this device will now be described.

OPERATION

When plate 14 has been mounted in cover 10, it is constantly urged outwards (arrow F, FIG. 4) by diaphragm spring 11, if reaction plate 17 is not bolted to cover 10. The device described above provides for limiting the axial displacement of the plate.

Retaining surface 39 of each hook member 38 comes into contact with limiting surface 35 of the corresponding tang 34. The outward travel of plate 14 is consequently limited by the distance d between surfaces 39 and 35.

This distance d corresponds to the spacing between surfaces 39 and 35 when the mechanism is in the engaged position and friction linings 18 are new (see FIG. 2).

As friction linings 18 wear, the distance between surface 39 and 35 decreases. When surfaces 39 and 35 come into contact, friction linings 18 are worn out and must be changed: distance d is greater than the permitted wear of the friction linings.

During storage, and more generally whenever the reaction plate is not bolted to the cover, hook members 38 are held in contact with abutment surfaces 35. Diaphragm spring 11 and drive tang 23 are then deformed to an extent greater than would be the case in operation with virtually worn out friction linings. This represents a maximum deformation which must not be exceeded, and thanks to cooperation between bosses 38 and tangs 34 complete distension of diaphragm spring 11, which would result in deterioration of tangs 23, is avoided.

If the means for limiting the travel of the pressure plate were not used and the only means used to limit expansion of the diaphragm spring were lugs like lugs 26A on the cover, situated between retaining lugs 26, excessive distension of the tangs could nevertheless occur due to careless manipulation of the mechanism. As a result of impact, pressure plate 14 could, by virtue of its inertia, move sufficiently far away from the cover to cause distension greater than the maximum value tolerated. The limiting means in accordance with the present invention provide for overcoming this disadvantage, through the cooperation of hook members 38 and tangs 34.

Naturally, when the mechanism is bolted to the reaction plate, there is sufficient axial clearance between hook member 38 and the transverse edge 36 delimiting the base of the U shape to permit release of the clutch.

Mounting the clutch mechanism is considerably simplified by the use of the means for limiting the travel of the pressure plate in accordance with the present invention.

The dimensions of tang 34 may be selected so that it is sufficiently flexible to enable pressure plate 14 to clip into cover 10, but sufficiently rigid to enable the tangs to fulfill their limiting member function efficiently.

This clipping engagement is facilitated by a set back portion 27n of rim 27 and a chamfer 38n on hook member 38.

This clipping engagement may be carried on an automatic assembly bench, of considerably simplified structure in that it is only necessary to position the pressure plate (with the drive tangs already rivetted to the corresponding lugs of the plate) above the cover with the various parts of the pressure plate aligned with the corresponding parts of the cover and correctly positioned, whereupon clipping is effected by elastic axial movement of the hook member over the lug, this being followed by the fitting and rivetting of the drive tangs to the cover.

Note also that the pressure plate may move axially under load, against the action of the diaphragm spring. This simplifies assembly in that a separate and special operation to release the diaphragm spring is not necessary.

As all these operations involve movement in the axial direction, the invention does away with the need for relative rotational movement as required with prior art mechanisms. This avoids the usual two stages of operation: insertion of the pressure plate into the cover with an axial movement, followed by rotation of the pressure plate within the cover so as to bring the various cooperating parts of the pressure plate and cover in face to face relationship with one another.

Consequently, the invention provides for considerably simplifying assembly benches for clutch mechanisms equipped with means for limiting the travel of the pressure plate.

In addition to the advantages described hereinabove, note that in accordance with the present invention the holes 33 promote cooling of the mechanism and friction linings.

MODIFICATIONS

An alternative embodiment of the means for limiting the travel of the pressure plate will now be described with reference to FIGS. 6 and 7.

Pressure plate 14 has axial bosses 20 comprising chamfered hook members 38a constituting retaining members.

Peripheral rim 27 of cover 10 is formed with holes 33a of U shape in the axial direction, the base of the U shape being in this instance towards the reaction plate. This provides a tang 34a forming a limiting member.

Formed in tang 34a is an aperture 37a of pre-determined width, in which engages hook member 38a. Hook member 38a has an internal surface 39a which, after the pressure plate is disposed within the cover, is at a distance d from surface 35a of the aperture 37a, acting as an abutment or limiting surface.

Operation is similar to that described previously.

When the reaction plate is not bolted on, the travel of pressure plate 14 is limited by contact between surfaces 35a and 39a.

The advantage of this embodiment is that tang 34a is not bent when, in the storage position, diaphragm spring 11 urges pressure plate 14 and consequently hook member 38a outwardly.

A clutch mechanism comprising this embodiment of limiting means may also be mounted by simple clipping action as previously described.

A third embodiment of the present invention will now be described with reference to FIGS. 8 and 9.

Substantially rectangular apertures 37b are formed at various places on peripheral rim 27 of cover 16. These apertures 37b may advantageously be those which exist already in certain clutch mechanisms for cooling purposes. A plastic abutment member 40 comprising clipping means in the form of two lugs 44 and 45 is inserted into each opening 37b and attached to the peripheral rim by force-fitting, lugs 44 and 45 clamping around the material 47 of the peripheral rim. Abutment member 40 has a surface 35b constituting an abutment or limiting surface and cooperating with a surface 39b of a hook member 38b of plate 14 constituting a retaining surface.

In this embodiment, abutment members 40 are linked together by an annular strap 41, but this feature is optional. Each of abutment members 40 further comprises an inclined surface 42.

The presence of this inclined surface 42 and the fact that abutment members 40 are made from an elastic material provide for elastic movement over the latter of hook members 38b during assembly. Operation is similar to that of the other two embodiments previously described.

A further embodiment of the invention will now be described with reference to FIGS. 10 and 11.

Figure 10:
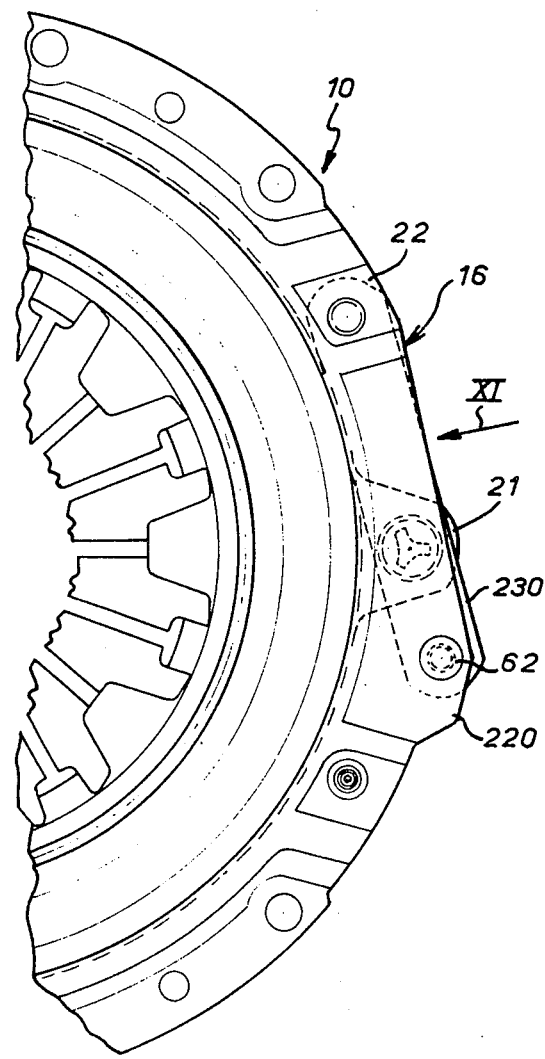
FIG. 10 is a partial view in elevation corresponding to FIG. 1 of another embodiment of the present invention.
Figure 11:
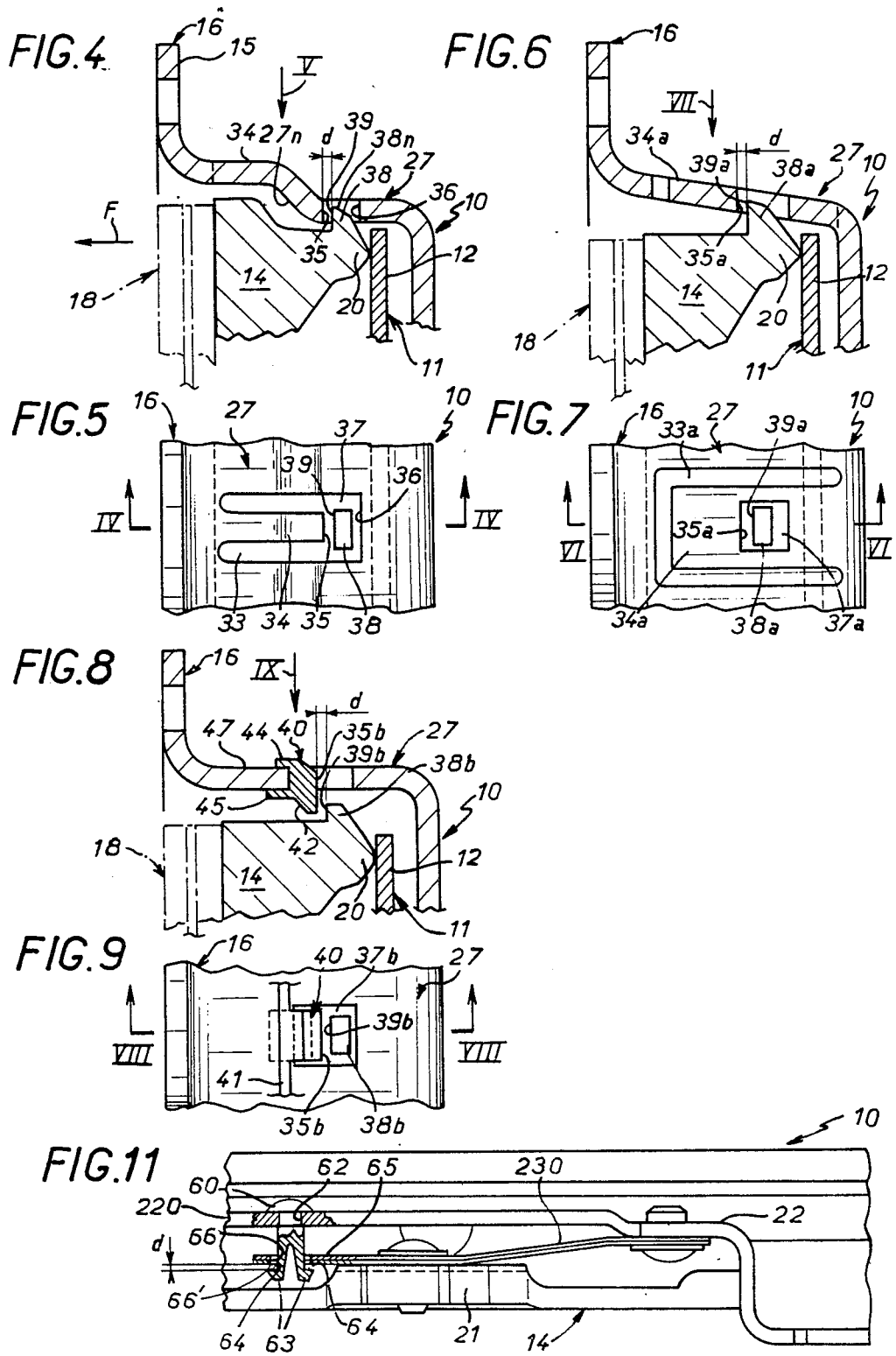
FIG. 11 is a partial view in the direction of the arrow XI in FIG. 10.

As will be seen in FIG. 10, areas 22 of peripheral flange 16 of cover 10 have been modified by the addition of an extension 220 overlapping virtually all of drive tang 230, which is substantially longer than that described previously. A peg 60 is crimped into an opening 62 in cover extension 220. This peg comprises lugs 63 which may deform towards one another elastically. Each of lugs 63 comprises a shoulder 64 constituting an abutment or limiting surface. Beyond the area in which they are rivetted to the lug 21 of the plate, tangs 230 comprise an extension 65 constituting retaining members or fixed abutment surface members, disposed in face to face relationship with the corresponding extension 220, which incorporates a bore 66. Thus the retaining member is carried by and attached to the pressure plate.

During assembly, lugs 63 move towards one another as they are engaged in bore 66 and then spring apart as they escape from the bore. Peg 60 can slide freely within bore 66. A gap d exists between shoulder 64 and extension 65 of tang 230, as previously mentioned.

When plate 14 is urged outwardly, shoulders 64 cooperate with abutment stop surfaces or retaining surfaces 66' which surround bores 66 in extensions 65 so as to limit the travel of pressure plate 14 and consequently the deformation of tang 230.

A further embodiment of the invention will now be described with reference to FIG. 12.

In the conventional manner, cover 10 comprises two series of areas 22 and 22a to which are screwed tangs 23.

When the motor rotates anti-clockwise, areas 22 are used to attach tangs 23, so that these operate in tension.

In the conventional manner, when the motor rotates clockwise, areas 22a are used so that tangs 23 still operate in tension. These arrangements are well-known and consequently will not be described in further detail here.

Figure 12:
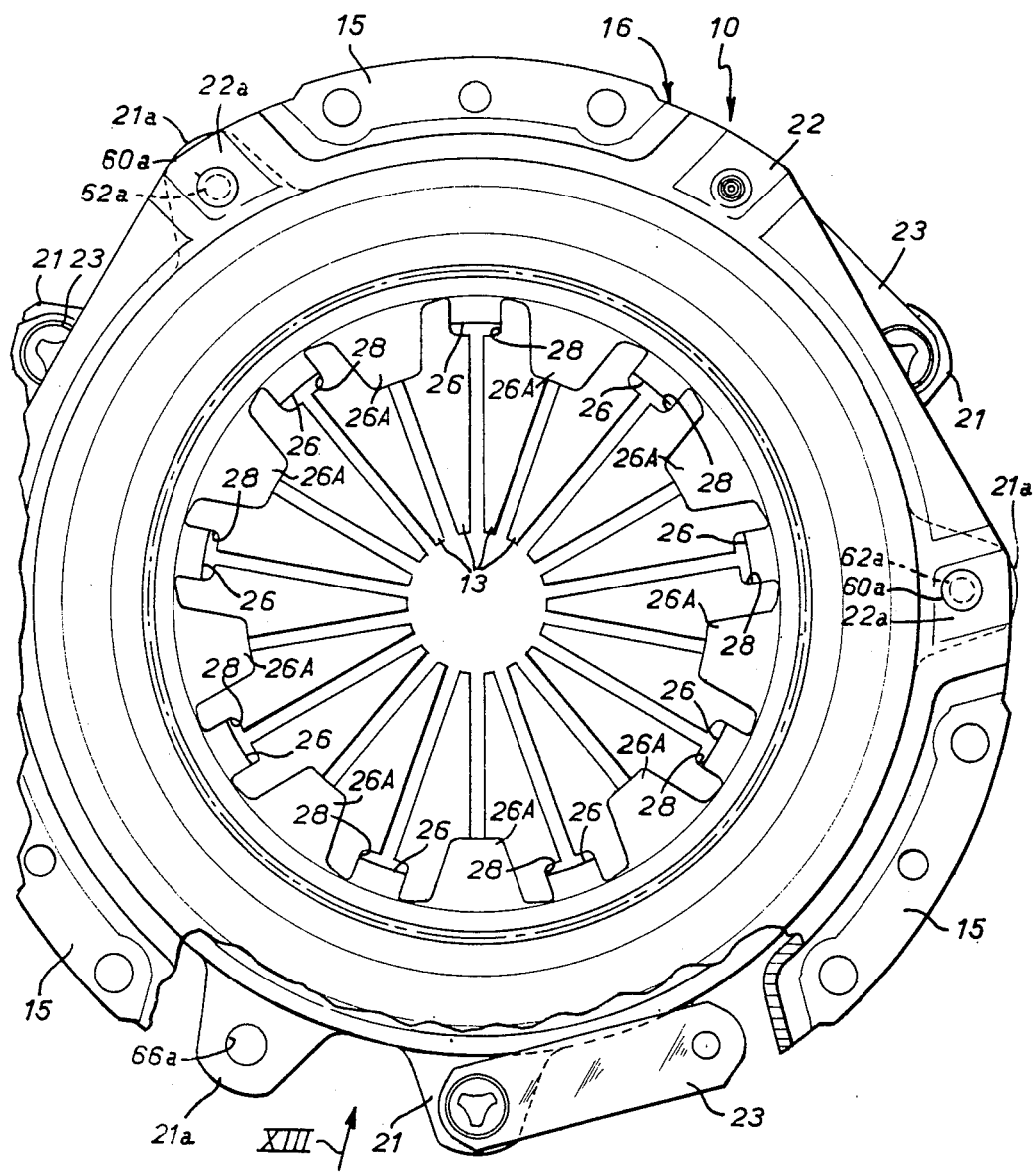
FIGS. 12 and 13 are views corresponding to FIGS. 10 and 11, respectively, of another embodiment of the present invention.
Figure 13:
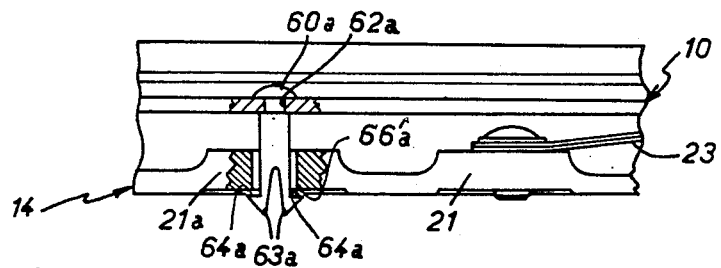

In the embodiment shown in FIGS. 12 and 13, the pressure plate carries a second series of lugs 21a to which tangs 23 are screwed. Lugs 21a are aligned with areas 22a (FIG. 13).

A peg 60a is crimped or force-fitted into the opening 62a in each area 22a and passes freely through a bore 66a in lug 21a.

As previously, peg 60a comprises lugs 63a which can deform towards one another elastically. Each lug 63a has a shoulder 64a constituting a retractable limiting member.

In this embodiment, an abutment bearing surface or retaining surface 66'a surrounding bore 66a cooperates (FIG. 13) with peg 60a and constitutes a retaining member.

As previously, a gap d exists between shoulder 64a of the peg and the abutment bearing surface 66'a.

It has already been mentioned that in the embodiment shown in FIG. 12, the motor rotates anti-clockwise and tangs 23 operate in tension. The same cover and the same pressure plate can be used for a motor rotating in the opposite direction. To this end, it is merely necessary to effect relative rotation of the plate and cover until each lug 21 comes into face to face relationship with an area 22 and lugs 21a are in the former positions of lugs 21. The tangs may therefore be disposed between lugs 21a and areas 22a of the peripheral flange of cover 10, whereas pegs 60a are crimped into the bores in areas 22 and slide freely in the bores in lugs 21.

Thus, in accordance with the present invention, the same mechanism equipped with means for limiting the travel of the pressure plate, and adapted to be assembled by simple clipping action, may be used with motors having different directions of rotation.

A further embodiment of the present invention, constituting a variant of an embodiment previously described, will now be described with reference to FIGS. 14, 15 and 16.

In this embodiment, lugs 321 are of greater circumferential extent than lugs 21, 21a of FIGS. 12 and 13, and have two identical bores 366 and 367. Tangs 323 extend between lugs 321 and areas 322 or 322a, according to the direction of rotation. Each tang is screwed into the bore which is furthest away in the circumferential direction from the area of the cover to which it is also screwed, so that tang 323 passes over the second bore in lug 321, whatever the rotation direction of the motor.

Figure 14:
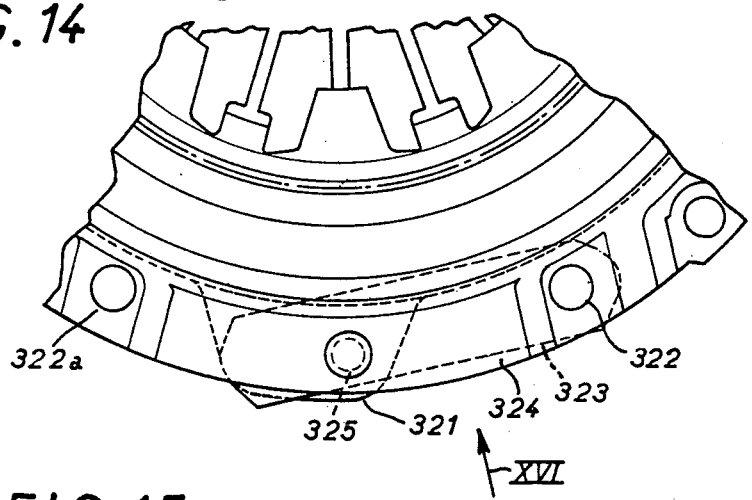
FIG. 14 is a partial view in elevation of a further embodiment of the present invention.
Figure 15:
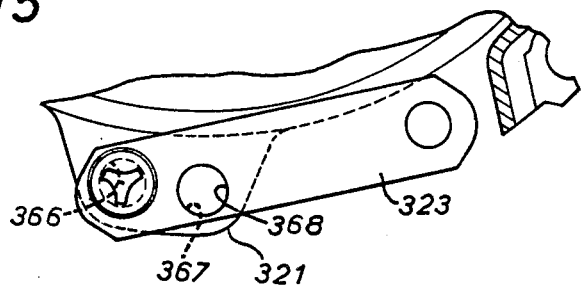
FIG. 15 is a partially cut-away view in elevation corresponding to FIG. 14.
Figure 16:
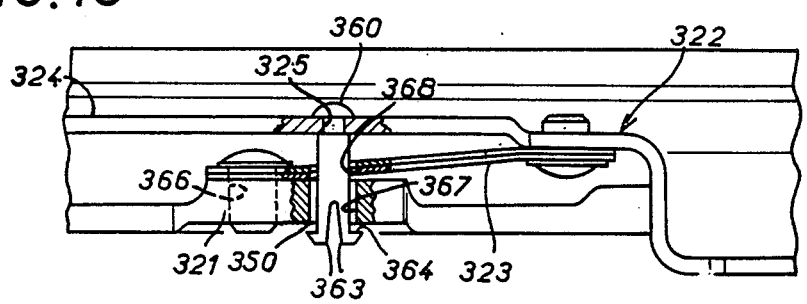
FIG. 16 is a partial view of the mechanism in the direction of the arrow XVI in FIG. 14.

In the embodiment shown in FIGS. 14 to 16, tangs 323 have a bore 368 in line with the unused bore in lug 321 (367 in this instance). In this embodiment, the peripheral flange of the cover comprises, between areas 322 and 322a, a flat area 324 with a bore 325 in its center.

As previously, a peg 360 comprising lugs 363 which may deform elastically towards one another and each having a shoulder 364 is crimped or force-fitted into bore 325 and passes freely through bores 368 of tang 367 and lug 321. Shoulders 364 cooperate with an abutment bearing surface or retaining surface 350 surrounding bore 367 (or 366, according to the direction of rotation).

If the motor rotates in the opposite direction, it is only necessary to rotate the plate and cover relative to one another so as to bring bore 366 into line with bore 325, a tang symmetrical to tang 323 being screwed into bore 367 and to area 322a.

A variant of the embodiment previously described with reference to FIGS. 14 to 16 will now be described with reference to FIG. 17.

Tang 323 is the same, but a plate like that shown in FIG. 1, that is to say comprising lugs 21, is used. The retaining member comprises an abutment bearing surface surrounding bore 368 in tang 323.

At the level of bore 368, the tang is only slightly deformed during operation. It is thus able to cooperate with shoulders 364 of lugs 363 of a peg similar to peg 360.

Another embodiment of the present invention will now be described with reference to FIG. 18.

The cover is similar to that described with reference to FIG. 14. It therefore comprises an area 324 with a bore 325. A metal peg 370 comprising a retractable lug 373 with a shoulder 374 is force-fitted into bore 325. This peg is force-fitted by means of a stem 375 of non-circular cross-section (rectangular in this example), so that lug 373 assumes the position shown in FIG. 18.

Shoulder 374 of lugs 373 cooperates with end 377 of tang 376.

End 377 constitutes a retaining member whereas lug 373 operates as a retractable limiting member. Note that shoulder 374 is able to cooperate with end 377 of the tang which projects cantilever fashion, but is short and thus not likely to bend.

Another embodiment of the present invention will now be described with reference to FIGS. 19 and 20.

Pressure plate 14 has, on its internal perimeter, projections 70 with openings 72. A peg 73 passes through diaphragm spring 11 and an opening 74 in cover 10, being supported by the pressure plate in which it is force-fit.

Peg 73 comprises a stem 75 whose diameter is greater than that of the body 76 of lugs 77 which can deform towards one another elastically and each of which comprises a shoulder 78.

In this embodiment, lugs 77 with their shoulder 78 constitute retractable limiting members, whereas the retaining member consists in an abutment bearing surface 74' surrounding each bore 74. Naturally, there is a gap d between shoulders 78 and cover 10, so delimiting the axial travel of the pressure plate, as previously.

Note that in the embodiments previously described, the limiting and retaining members were outside the area on which diaphragm spring 11 bears on pressure plate 14. In this instance, they are situated within this area.

Another embodiment of the present invention will now be described with reference to FIG. 21.

In this embodiment, the means whereby diaphragm spring 11 pivots comprise studs 80 attached to cover 10 and carrying rings 81, 82, in a manner known to those skilled in the art. A peg 83 with lugs 84 which may be deformed elastically towards one another, each lug 84 having a shoulder 85, is inserted in a bore 88 in certain studs 80 and in a bore 89 in the pressure plate. Shoulders 85 cooperate with an annular shoulder 86 forming the abutment bearing surface surrounding bore 89. As an alternative (not shown), the peg is inserted in a bore in a centering peg of the diaphragm spring supported by the cover.

In this instance, shoulders 86 constitute the retaining members whereas shoulders 85 constitute the retractable limiting members. Note that the limiting and retaining members are situated between the inner and outer perimeters of the pressure plate.

Another embodiment of the invention, applied to "pull release" type diaphragm spring clutches, will now be described.

This description will be given with reference to FIG. 22, which is a partial schematic representation of such a clutch.

A diaphragm spring 11' comprising a Belleville spring has its outer part bearing on a cover 10' and the internal perimeter of a part 12' forming the Belleville spring bearing on a pressure plate 14'. In this embodiment, peg 90 passes through a bore 92 in a rivet 93 used to attach drive tang 99.

FIG. 23 shows this embodiment in more detail. Tangs 99 are rivetted to pressure plate 14' by rivets 93. Peg 90 is force-fitted into a bore 94 in cover 10'. As previously, peg 90 comprises lugs 95 each having a shoulder 96 adapted to cooperate with an annular surface 97 of rivet 93 constituting the abutment bearing surface.

In this embodiment, it is the annular surface 97 which constitutes the retaining member and the shoulders 96 which constitute the limiting members.

It will be understood that various changes in the details, materials and arrangements of parts, which have been herein described and illustrated in order to explain the nature of the invention, may be made by those skilled in the art within the principle and scope of the invention as expressed in the appended claims.

For example, the embodiments shown in FIGS. 1 to 23 relate to diaphragm spring clutches. It will be evident that the present invention is not limited to this type of clutch and that its teaching remains valid if other elastic means are used in place of the diaphragm spring, such as helical coil springs, for example.

Note also that in the embodiments described and shown involving a peg carried by the cover with shoulders on lugs cooperating with a bore fast with the pressure plate, it is possible, by simple inversion, to make the peg fast with the pressure plate, the retaining member consisting in this case of an abutment bearing surface surrounding a bore in the cover. In FIG. 11, for example, the peg may be crimped into bore 66 and slide in bore 62 in the cover.

In the embodiments shown in FIGS. 1 to 9, the clipping in of the pressure plate is effected under load, against the action of the diaphragm spring. In the embodiments involving a peg (FIGS. 10 to 23), the peg may be fitted to the pre-assembled mechanism, lightly crimped or free to slide in the relevant opening in the plate or cover, the peg being for preference of a synthetic material.

Thus it is possible to ship clutch mechanisms with or without means for retaining the pressure plate.

An embodiment of this kind is particularly advantageous in the case of replacement mechanisms. Mechanisms supplied for fitting as original parts are tested and then stored carefully in packing cases with protective means placed between them, for direct shipment to the equipment manufacturer for installation.

In view of the relatively limited number of handling operations, it is rare for such mechanisms to be returned due to deterioration of the tangs.

This does not apply when the mechanisms are supplied as replacements, as these are subject to numerous handling operations at all points in the distribution chain, and are sometimes stored in a careless manner, being merely piled up, for example.

Return mechanisms have been inspected and show that the return force function of the tangs has suffered as a result of movement of the pressure plate relative to the cover due to inertia, as a result of careless handling, impact, dropping, etc . . . , especially in mechanisms where no means are provided for limiting the expansion of the diaphragm spring, there being equilibrium in the storage configuration between the return force exerted by the tangs and the force exerted by the elastic means. To overcome these disadvantages, it is only necessary to insert the pegs by hand, freely engaged or lightly crimped into the openings in question. It is therefore possible to distinguish between mechanisms to be supplied for fitting as original equipment or as replacements.

The invention naturally applies also to reconditioned mechanisms.

Note that in certain cases it is possible to insert a wedge between the retaining member and the limiting member to limit the projection of the diaphragm spring relative to the cover in the engaged position and so to facilitate removal of the mechanism. The present invention offers great flexibility in utilization while improving the productivity of clutch mechanism assembly lines.

It is claimed:

1. A clutch mechanism comprising a preassembled combination of components, said combination including an axially fixed part, an axially movable part, elastic means for axially biasing said axially movable part away from said axially fixed part towards a storage position, means for limiting the axial movement of said movable part in the storage position against the bias of said elastic means, said means for limiting the axial movement of said movable part comprising a retaining member on a first of said fixed part and said movable part and a transversely deflectable limiting member on a second of said fixed part and said movable part, said limiting member being transversely deflectable for clearing said retaining member during assembly of said combination of components and defining an axial abutment for determining the storage position for said movable part once said retaining member clears said limiting member.

2. A clutch mechanism according to claim 1, wherein said first part comprises a pressure plate, and said second part comprises a cover.

3. A clutch mechanism according to claim 2, wherein said retaining member comprises an axial boss formed on said pressure plate for engagement with said elastic means, a retaining surface formed in said axial boss for abutting engagement with a limiting surface formed on said limiting member in the storage position of said pressure plate.

4. A clutch mechanism according to claim 3, wherein said cover has a sidewall, and said limiting member comprises a tang formed in a cutout in said sidewall.

5. A clutch mechanism according to claim 4, wherein said cover also has an annular radial wall against which said elastic means bears, and said cutout is U-shaped and oriented with legs extending axially, and a bight portion joining said legs and being axially remote from said annular radial wall.

6. A clutch mechanism according to claim 4, wherein said cover also has an annular radial wall against which said elastic means bears, and said cutout is U-shaped and oriented with legs extending axially, and a bight portion joining said legs relatively axially adjacent said annular radial wall.

7. A clutch mechanism according to claim 4, wherein an aperture is formed in said tang for receiving said retaining surface on said retaining member.

8. A clutch mechanism according to claim 2, wherein there are a plurality of said retaining members and a corresponding plurality of said limiting members, said cover having a sidewall including a plurality of circumferentially spaced apertures, said limiting members comprising abutments of elastic material secured in said apertures.

9. A clutch mechanism according to claim 8, further comprising clipping means for force-fitting said abutments in respective apertures of said sidewall.

10. A clutch mechanism according to claim 8, further comprising a circular strap attaching said abutments together.

11. A clutch mechanism according to claim 8, wherein said retaining members comprise a plurality of correspondingly circumferentially spaced radial shoulders at the peripheral of said pressure plate.

12. A clutch mechanism according to claim 28, wherein said radial shoulders are adjacent to axial bosses formed on said pressure plate for engagement with said elastic means.

13. A clutch mechanism according to claim 1, wherein said limiting member comprises an axial peg having two lugs, each of said lugs having a shoulder which is transversely resiliently deflectable, said retaining member comprising an abutment surface defining an aperture receiving said peg and being engageable with said shoulders in the storage position.

14. A clutch mechanism according to claim 13, and drive straps for connecting said movable part for rotation with said fixed part and permitting relative axial displacement relative thereto, a hollow rivet fixedly securing one of said drive straps to one of said fixed part and said movable part, said rivet defining a bore receiving said peg, said retaining member being defined by said rivet.

15. A clutch mechanism according to claim 13, wherein said first part comprises a cover, said second part comprises a pressure plate, and said elastic means comprises a diaphragm spring.

16. A clutch mechanism according to claim 15, further comprising studs for rockably mounting said diaphragm spring, one of said studs having an axial bore receiving said peg.

17. A clutch mechanism according to claim 1, wherein said limiting member comprises an axial peg having a transversely deflectable lug, and a shoulder formed on said lug for abutting engagement with said retaining member.

18. A clutch mechanism according to claim 17, further comprising drive straps fixing said fixed part and said movable part for rotation together and permitting displacement of said movable part relative to said fixed part, said retaining member being defined by an end of one of said drive straps and cooperable with said shoulder on said peg lug.

19. A clutch mechanism according to claim 17, wherein said first part comprises a cover, said second part comprises a pressure plate, and said elastic means comprises a diaphragm spring, said peg having a stem of noncircular cross-section force-fitted in a bore in said cover.

* * * * *